United States Patent
Shigenai et al.

(10) Patent No.: US 11,963,633 B2
(45) Date of Patent: Apr. 23, 2024

(54) COOKING UTENSIL

(71) Applicant: DAIKIN INDUSTRIES, LTD., Osaka (JP)

(72) Inventors: Fumiko Shigenai, Osaka (JP); Hiromichi Momose, Osaka (JP); Yasukazu Nakatani, Osaka (JP); Tomohiro Shiromaru, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 556 days.

(21) Appl. No.: 17/059,612

(22) PCT Filed: Apr. 19, 2019

(86) PCT No.: PCT/JP2019/016883
§ 371 (c)(1),
(2) Date: Nov. 30, 2020

(87) PCT Pub. No.: WO2019/230249
PCT Pub. Date: Dec. 5, 2019

(65) Prior Publication Data
US 2021/0219775 A1    Jul. 22, 2021

(30) Foreign Application Priority Data
May 30, 2018  (JP) ................. 2018-103732

(51) Int. Cl.
*A47J 36/04*  (2006.01)
*A47J 37/10*  (2006.01)
*B05D 7/00*  (2006.01)

(52) U.S. Cl.
CPC ............. *A47J 36/04* (2013.01); *A47J 37/10* (2013.01); *B05D 7/576* (2013.01)

(58) Field of Classification Search
CPC .......... A47J 37/10; A47J 36/04; A47J 27/002; A47J 36/025; B05D 7/576
See application file for complete search history.

(56) References Cited

U.S. PATENT DOCUMENTS

| | | | |
|---|---|---|---|
| 2004/0188338 A1* | 9/2004 | Kato ................. | C02F 1/505 210/283 |
| 2015/0203703 A1* | 7/2015 | Momose ........... | A47J 36/025 220/573.1 |
| 2017/0112320 A1* | 4/2017 | Ferron ............... | A47J 36/04 |

FOREIGN PATENT DOCUMENTS

| | | | | |
|---|---|---|---|---|
| CN | 107981707 A | * | 5/2018 | .......... A47J 27/00 |
| CN | 107981707 A | | 5/2018 | |

(Continued)

OTHER PUBLICATIONS

International Search Report for PCT/JP2019/016883 dated, Jul. 23, 2019 (PCT/ISA/210).

(Continued)

*Primary Examiner* — Dana Ross
*Assistant Examiner* — Kuangyue Chen
(74) *Attorney, Agent, or Firm* — Sughrue Mion, PLLC (57) ABSTRACT

Provided is a cooking utensil having an excellent design. The cooking utensil includes a bottom and a side extending substantially upward from a perimeter of the bottom. The bottom includes a bottom laminate film on an inner surface thereof. The side includes a side laminate film that is different from the bottom laminate film on an inner surface thereof. The bottom laminate film and the side laminate film have different color tones.

15 Claims, 2 Drawing Sheets

(56) References Cited

FOREIGN PATENT DOCUMENTS

| | | |
|---|---|---|
| JP | 59-71718 U | 5/1984 |
| JP | 62-195059 A | 8/1987 |
| JP | 2003-276129 A | 9/2003 |
| JP | 2014-040093 A | 3/2014 |
| JP | 2014-42824 A | 3/2014 |
| JP | 2015-157474 A | 9/2015 |
| JP | 3208334 U | 1/2017 |
| KR | 10-2007-0075248 A | 7/2007 |

OTHER PUBLICATIONS

Extended European Search Report dated Mar. 10, 2022 in European Application No. 19812268.1.
International Preliminary Report on Patentability with translation of Written Opinion dated Dec. 1, 2020, in International Application No. PCT/JP2019/016883.

* cited by examiner

COOKING UTENSIL

CROSS REFERENCE TO RELATED APPLICATIONS

This application is a National Stage of International Application No. PCT/JP2019/016883 filed Apr. 19, 2019, claiming priority based on Japanese Patent Application No. 2018-103732 filed May 30, 2018.

TECHNICAL FIELD

The disclosure relates to cooking utensils.

BACKGROUND ART

Common cooking utensils such as frying pans, electric griddles, pots, and inner pots of rice cookers include a coating layer of fluororesin, which has excellent properties such as heat resistance, non-stickiness, and stain resistance, on a substrate of metal such as aluminum or stainless steel for the purpose of preventing burning or sticking of cooking materials during cooking with heat.

In order mainly to improve the abrasion resistance of such cooking utensils including a coating layer of fluororesin, in some cases, a variety of inorganic material is added as filler to the material for forming the coating layer.

Patent Literature 1 discloses a coating structure including, on a substrate, a film of a substance having a far infrared effect as an inner layer and a film containing a fluororesin as an outer layer.

Patent Literature 2 discloses a cooking utensil including a substrate and a fluororesin layer that contains perfluoro fluororesin and a pigment of flaky particulate substance, the pigment containing at least one selected from the group consisting of metal oxide-coated silica flake, metal oxide-coated glass flake, and silicon oxide-coated mica.

Patent Literature 3 discloses a coated article including a substrate, a primer layer (A) containing a fluorine-containing polymer (a) and a heat-resistant resin, a fluorine-containing layer (B) formed from a powdery coating material (I), and a fluorine-containing layer (C) formed from a powdery coating material (II), the powdery coating material (I) containing particles of a melt-fabricable fluorine-containing polymer (b) and particles of a filler (i), the number of particles of the filler (i) being 0.0001 to 30.0 relative to 100 particles of the melt-fabricable fluorine-containing polymer (b), the powdery coating material (II) containing particles of a melt-fabricable fluorine-containing polymer (c) and particles of a filler (ii), the number of the particles of the filler (ii) being 0.0001 to 30.0 relative to 100 particles of the melt-fabricable fluorine-containing polymer (c).

CITATION LIST

Patent Literature

Patent Literature 1: JP 2003-276129 A
Patent Literature 2: JP 2014-42824 A
Patent Literature 3: JP 2015-157474 A

SUMMARY OF INVENTION

Technical Problem

The disclosure aims to provide a cooking utensil having an excellent design.

Solution to Problem

The disclosure provides a cooking utensil including a bottom and a side extending substantially upward from a perimeter of the bottom, the bottom including a bottom laminate film on an inner surface thereof, the side including a side laminate film that is different from the bottom laminate film on an inner surface thereof, the bottom laminate film and the side laminate film having different color tones.

In the cooking utensil of the disclosure, the bottom laminate film and the side laminate film preferably have different far infrared effects.

In the cooking utensil of the disclosure, the bottom laminate film and the side laminate film preferably have different anticorrosive effects.

The bottom laminate film and the side laminate film preferably include a primer layer.

Preferably, the side laminate film includes a primer layer and a layer that contains a substance having a far infrared effect, and the substance having a far infrared effect includes at least one selected from ceramic and carbon.

The ceramic preferably includes at least one selected from the group consisting of aluminum oxide, beryllium oxide, cerium oxide, chromium oxide, cobalt oxide, nickel oxide, silicon oxide, tantalum oxide, thallium oxide, vanadium oxide, yttrium oxide, zinc oxide, zirconium oxide, magnesium oxide, and complex oxides of any of these, aluminum boride, barium boride, calcium boride, cerium boride, hafnium boride, lanthanum boride, strontium boride, yttrium boride, aluminum nitride, silicon nitride, titanium nitride, boron carbide, chromium carbide, hafnium carbide, molybdenum carbide, silicon carbide, tantalum carbide, thallium carbide, tungsten carbide, yttrium carbide, and zirconium carbide.

The layer that contains a substance having a far infrared effect preferably further contains a fluororesin.

The fluororesin preferably includes at least one selected from the group consisting of polytetrafluoroethylene, a tetrafluoroethylene-perfluoroalkyl vinyl ether copolymer, a tetrafluoroethylene-hexafluoropropylene copolymer, polychlorotrifluoroethylene, a tetrafluoroethylene-ethylene copolymer, and polyvinylidene fluoride.

Preferably, the bottom laminate film includes a primer layer and a layer that contains a substance having an anticorrosive effect, and the substance having an anticorrosive effect includes at least one selected from the group consisting of glass, metal, a natural mineral, diamond, fluorinated diamond, and a flaky particulate substance and a metal-oxide-coated product thereof.

The layer that contains a substance having an anticorrosive effect preferably further contains a fluororesin.

The fluororesin preferably includes at least one selected from the group consisting of polytetrafluoroethylene, a tetrafluoroethylene-perfluoroalkyl vinyl ether copolymer, a tetrafluoroethylene-hexafluoropropylene copolymer, polychlorotrifluoroethylene, a tetrafluoroethylene-ethylene copolymer, and polyvinylidene fluoride.

Preferably, the primer layer contains a heat-resistant resin, and the heat-resistant resin includes at least one selected from the group consisting of polyamide-imide resin, polyimide resin, polyethersulfone resin, polyetherimide resin, polyether ether ketone resin, aromatic polyester resin, and polyarylene sulfide resin.

Preferably, the heat-resistant resin contains polyethersulfone resin and one or both of polyamide-imide resin and polyimide resin, and the polyethersulfone resin represents 65 to 85% by mass of a total amount of the polyethersulfone resin, the polyamide-imide resin, and the polyimide resin.

Preferably, the primer layer contains a heat-resistant resin and a fluororesin, and the heat-resistant resin is in an amount of 15 to 50% by mass of a total solid content of the heat-resistant resin and the fluororesin.

The fluororesin in the primer layer preferably includes at least one selected from the group consisting of polytetrafluoroethylene, a tetrafluoroethylene-perfluoroalkyl vinyl ether copolymer, a tetrafluoroethylene-hexafluoropropylene copolymer, polychlorotrifluoroethylene, a tetrafluoroethylene-ethylene copolymer, and polyvinylidene fluoride.

The bottom laminate film and the side laminate film preferably further include a clear layer.

The cooking utensil of the disclosure is preferably a frying pan.

Advantageous Effects of Invention

The cooking utensil of the disclosure having any of the above structures has an excellent design.

DESCRIPTION OF EMBODIMENTS

The disclosure is described in detail below.

The cooking utensil of the disclosure includes a bottom and a side extending substantially upward from a perimeter of the bottom.

Figure 1:
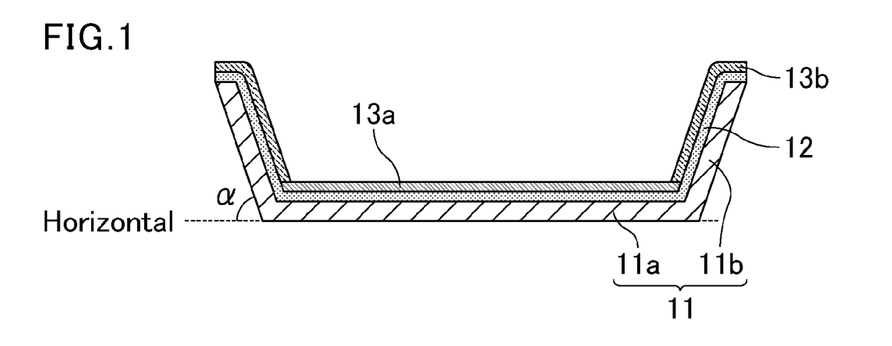
FIG. 1 is a schematic cross-sectional view of an example of the cooking utensil of the disclosure (bottom: two layers, side: two layers).

In an embodiment, as illustrated in FIG. 1, the cooking utensil of the disclosure includes bottom and side laminate films on a substrate 11 that includes a side 11b extending from a perimeter of a bottom 11a.

The cooking utensil of the disclosure preferably includes a substrate, and preferably includes a bottom laminate film provided on an inner surface of a bottom of the substrate and a side laminate film provided on an inner surface of a side of the substrate.

The substrate may be formed from any material, and examples thereof include metals, including simple metals such as iron, aluminum, stainless steel, and copper, and alloys of any of these; and nonmetal inorganic materials such as enamel, glass, and ceramic. An example of the alloys is stainless steel. The material of the substrate is preferably a metal, more preferably aluminum or stainless steel.

The substrate may optionally undergo a surface treatment such as degreasing or surface roughening. The surface roughening may be performed by any method, such as chemical etching with an acid or alkali, anodic oxidation (anodizing), or sandblasting.

The substrate may optionally undergo degreasing in which the substrate alone is baked at 380° C. so that impurities such as oil are pyrolized and removed. The substrate used may be an aluminum substrate having undergone a surface treatment and then surface roughening with an alumina abrasive material.

The bottom and the side are those recognizable as a bottom and a side, respectively. For example, preferably, the bottom is a portion provided at an angle of smaller than 15 degrees with the horizontal line and the side is a portion provided at an angle of 15 degrees or greater with the horizontal line. The angle with the horizontal line may be an angle represented by α in FIG. 1, for example.

In the case of a hemispherical cooking utensil in which the bottom and the side are continuous, a portion at an angle of smaller than 15 degrees with the horizontal line may be regarded as the bottom and a portion at an angle of 15 degrees or greater with the horizontal line may be regarded as the side.

The cooking utensil of the disclosure includes a bottom laminate film on an inner surface of the bottom and a side laminate film that is different from the bottom laminate film on an inner surface of the side. The bottom laminate film and the side laminate film have different color tones. Different color tones between the bottom laminate film and the side laminate film can provide a cooking utensil having an excellent design. Such an excellent design can arouse willingness to buy.

The color tones can be measured using a color difference meter such as color meter ZE6000 available from Nippon Denshoku Industries Co., Ltd.

The cooking utensil of the disclosure may have two-tone coloring with the bottom and the side having different color tones or may have a gradation with the color tone gradually changing from the bottom to the side. The side may include one side laminate film or may include two or more side laminate films having different color tones. In the case of two or more side laminate films, at least one of them is different in color tone from the bottom laminate film.

The bottom may include one bottom laminate film or may include two or more bottom laminate films having different color tones. In the case of two or more bottom laminate films, at least one of them is different in color tone from the side laminate film.

The cooking utensil of the disclosure includes a bottom laminate film on at least part of the inner surface of the bottom and a side laminate film that is different from the bottom laminate film on at least part of the inner surface of the side. The bottom laminate film have no need to be provided on the entire inner surface of the bottom and the bottom laminate film have no need to be provided on the entire inner surface of the side.

The difference in color tone between the bottom laminate film and the side laminate film may be achieved by adding different substances to the bottom laminate film and the side laminate film, for example.

Substances to be added may be any substances that can give different color tones to the bottom laminate film and the side laminate film. Examples thereof include a substance having a far infrared effect and a substance having an anticorrosive effect to be described later.

In the cooking utensil of the disclosure, the color difference ($\Delta E^*_{ab}$) between the color tone ($L^*_1$, $a^*_1$, $b^*_1$) of the bottom laminate film and the color tone ($L^*_2$, $a^*_2$, $b^*_2$) of the side laminate film is calculated by the following formula.

$$\Delta E_{ab}^* = \sqrt{(L_2^*-L_1^*)^2+(a_2^*-a_1^*)^2+(b_2^*-b_1^*)^2} \quad \text{[Math. 1]}$$

This value (color difference) is preferably higher than 2.3. The color difference is more preferably 2.5 or higher, still more preferably 5.0 or higher, particularly preferably 10.0 or higher.

In the case where the cooking utensil of the disclosure includes two or more bottom laminate films and side laminate films having different color differences, the maximum color difference present in a combination of a bottom laminate film and a side laminate film at least falls within the above range.

In the cooking utensil of the disclosure, the bottom laminate film and the side laminate film preferably have different far infrared effects. Such difference in far infrared effect between the bottom and the side can give variations in thermal efficiency for materials to be cooked, which can provide a wide range of cooking.

The difference in far infrared effect can be confirmed by measuring the far infrared emissivity (integral emissivity) at 200° C. using a far infrared emissivity meter.

The side laminate film preferably has a higher far infrared emissivity at 200° C. than the bottom laminate film. In common cooking, heating occurs from the bottom of a cooking utensil, so that a portion in contact with the bottom is more greatly heated. A higher far infrared emissivity of the side laminate film than that of the bottom laminate film enables more uniform heat conduction to materials to be cooked.

The cooking utensil of the disclosure preferably has a ratio (far infrared emissivity of side laminate film at 200° C.)/(far infrared emissivity of bottom laminate film at 200° C.) of 1.1 or higher, more preferably 1.2 or higher, still more preferably 1.3 or higher. The ratio is preferably as high as possible and the upper limit thereof may be, but is not limited to, 1.4.

In the case where the cooking utensil of the disclosure includes two or more bottom laminate films and two or more side laminate films having different far infrared effects, the maximum color difference present in a combination of a bottom laminate film and a side laminate film at least falls within the above range.

The far infrared emissivity of the side laminate film at 200° C. is preferably 0.80 or higher, more preferably 0.85 or higher, still more preferably 0.90 or higher.

In the case where the cooking utensil of the disclosure includes two or more side laminate films having different far infrared effects, at least one side laminate film has a far infrared emissivity within the above range. Preferably, every side laminate film provided on the side has a far infrared emissivity within the above range.

The far infrared emissivity of the bottom laminate film at 200° C. is preferably lower than 0.80, more preferably 0.75 or lower, still more preferably 0.70 or lower.

In the case where the cooking utensil of the disclosure includes two or more bottom laminate films having different far infrared effects, at least one bottom laminate film has a far infrared emissivity within the above range. Preferably, every bottom laminate film provided on the bottom has a far infrared emissivity within the above range.

The far infrared emissivity is a value measured at 200° C. using a far infrared emissivity meter (JIR5500 available from JEOL Ltd., equipped with an infrared radiation unit IR-IRR200).

In the cooking utensil of the disclosure, the bottom laminate film and the side laminate film preferably have different anticorrosive effects. The anticorrosive effect may be determined as follows, for example. Specifically, two cuts are formed on the film surface using a utility knife such that they each have a length of 50 mm, reach the substrate, and cross each other (in a crosscut pattern). This coated plate for testing is immersed in a solution of 20 g Oden No Moto (Japanese Seasoning & Soup Mix) (available from S&B Foods Inc.) in 1 L water and the temperature is maintained at 70° C. for 500 hours. Then, the anticorrosive effect can be determined based on the presence or absence of any defects such as occurrence of blistering (scabs in the film).

Preferred embodiments of the side laminate film and the bottom laminate film are described in more detail below.

The side laminate film may have a structure of two layers or a structure of three or more layers.

The side laminate film preferably includes a layer that contains a substance having a far infrared effect (hereinafter, also referred to as a "far infrared effect substance-containing layer"). The presence of a substance having a far infrared effect can give improved thermal conduction efficiency from the side, which enables more uniform cooking.

The substance having a far infrared effect preferably includes at least one selected from ceramic and carbon.

The ceramic preferably includes at least one selected from the group consisting of aluminum oxide, beryllium oxide, cerium oxide, chromium oxide, cobalt oxide, nickel oxide, silicon oxide, tantalum oxide, thallium oxide, vanadium oxide, yttrium oxide, zinc oxide, zirconium oxide, magnesium oxide, and complex oxides of any of these, aluminum boride, barium boride, calcium boride, cerium boride, hafnium boride, lanthanum boride, strontium boride, yttrium boride, aluminum nitride, silicon nitride, titanium nitride, boron carbide, chromium carbide, hafnium carbide, molybdenum carbide, silicon carbide, tantalum carbide, thallium carbide, tungsten carbide, yttrium carbide, and zirconium carbide. More preferred is at least one selected from the group consisting of silicon carbide, aluminum oxide, boron carbide, silicon nitride, zirconium oxide, and boron nitride.

Examples of the carbon include carbon black, bincho charcoal, and graphite.

The far infrared effect substance-containing layer preferably contains a substance having a far infrared effect in an amount of 10% by mass or more, more preferably 15% by mass or more, still more preferably 20% by mass or more, while preferably 50% by mass or less, more preferably 45% by mass or less, still more preferably 40% by mass or less.

The far infrared effect substance-containing layer preferably further contains a fluororesin. The fluororesin used may be a polymer in which all hydrogen atoms binding to any carbon atom constituting the main chain are replaced by fluorine atoms. The fluororesin may be non melt-fabricable or may be melt-fabricable.

The fluororesin is preferably obtainable by polymerizing an unsaturated monomer containing in the molecule a vinyl group in which any or all of hydrogen atoms are replaced by fluorine atoms. The fluororesin may be a homopolymer of this fluorine-containing unsaturated monomer or may be a copolymer of two or more such fluorine-containing unsaturated monomers. One fluororesin may be used alone or two or more thereof may be used in combination.

The fluororesin preferably includes at least one selected from the group consisting of polytetrafluoroethylene (PTFE), a tetrafluoroethylene-perfluoro(alkyl vinyl ether) copolymer (PFA), a tetrafluoroethylene-hexafluoropropylene copolymer (FEP), polychlorotrifluoroethylene (PCTFE), a tetrafluoroethylene-ethylene copolymer (ETFE), and polyvinylidene fluoride (PVdF). More preferred is at least one selected from the group consisting of PTFE, PFA, and FEP, and still more preferred is PTFE.

One fluororesin may be used or two or more thereof may be used in combination.

PTFE may be a TFE homopolymer or may be a modified PTFE. The "modified PTFE" as used herein means a copolymer of TFE with a comonomer in a small amount such that no melt-fabricability is applied to the resulting copolymer. Examples of the comonomer in a small amount include, but are not limited to, hexafluoropropylene (HFP), chlorotrifluoroethylene (CTFE), and perfluoro(alkyl vinyl ether) (PAVE). The proportion of the comonomer in a small amount added to the modified PTFE varies in accordance with the type thereof. In the case of PAVE, for example, the proportion is commonly preferably 0.001 to 1% by mass of the total mass of TFE and the comonomer in a small amount.

Fluororesins other than PTFE (e.g., PFA, FEP, ETFE) are preferably melt-fabricable. The melt-fabricable means an ability to be processible in a molten state using a conventional processing device such as an extruder and an injection molding machine. Thus, fluororesins other than PTFE commonly have a melt flow rate (MFR) of 0.01 to 100 g/10 min.

The MFR is a value obtainable as the mass (g/10 min) of a polymer that flows out of a nozzle having an inner diameter of 2 mm and a length of 8 mm per 10 minutes at a predetermined measurement temperature (e.g., 372° C. for PFA and FEP, 297° C. for ETFE) and load (e.g., 5 kg for PFA, FEP, and ETFE) in accordance with the type of the fluororesin using a melt indexer (available from Yasuda Seiki Seisakusho Ltd.) in conformity with ASTM D1238.

Fluororesins other than PTFE each preferably have a melting point of 150° C. to lower than 322° C., more preferably 200° C. to 320° C., still more preferably 240° C. to 320° C. The melting point is the temperature corresponding to the maximum value on a heat-of-fusion curve drawn by increasing the temperature at a rate of 10° C./min using a differential scanning calorimeter (DSC).

FEP preferably includes a HFP unit in an amount of more than 2% by mass and 20% by mass or less, more preferably 10 to 15% by mass.

PAVE in PFA is preferably one containing a C1-C6 alkyl group, more preferably perfluoro(methyl vinyl ether) (PMVE), perfluoro(ethyl vinyl ether) (PEVE), or perfluoro(propyl vinyl ether) (PPVE).

PFA preferably includes a PAVE unit in an amount of more than 2% by mass and 5% by mass or less, more preferably 2.5 to 4.0% by mass.

HFP and PFA each may be a polymer further including an additional monomer as long as they each have the aforementioned structure. An example of the additional monomer may be PAVE for FEP and HFP for PFA. One or two or more of the additional monomers may be used.

The additional monomer commonly preferably represents 1% by mass or less of the mass of the fluororesin, although the amount varies in accordance with the type thereof. The upper limit is more preferably 0.5% by mass, still more preferably 0.3% by mass.

The fluororesin can be produced by a conventionally known method.

The far infrared effect substance-containing layer preferably contains a fluororesin in an amount of 20% by mass or more, more preferably 25% by mass or more, still more preferably 30% by mass or more, while preferably 90% by mass or less, more preferably 85% by mass or less, still more preferably 80% by mass or less, further more preferably 70% by mass or less, particularly preferably 60% by mass or less.

The far infrared effect substance-containing layer may contain a fluororesin in an amount of 50% by mass or more, 55% by mass or more, or 60% by mass or more.

In the case where the side laminate film includes a far infrared effect substance-containing layer directly on the substrate, the far infrared effect substance-containing layer also preferably contains a heat-resistant resin. The heat-resistant resin suitably used may be one to be described later for the primer layer.

In this case, the sum of the fluororesin and the heat-resistant resin preferably represents 20% by mass or more, more preferably 25% by mass or more, still more preferably 30% by mass or more, and may represent 50% by mass or more, 55% by mass or more, or 60% by mass or more. The sum of the fluororesin and the heat-resistant resin preferably represents 90% by mass or less, more preferably 85% by mass or less, still more preferably 80% by mass or less, further more preferably 70% by mass or less, particularly preferably 60% by mass or less.

The heat-resistant resin is preferably in an amount of 15 to 50% by mass of the total solid content of the heat-resistant resin and the fluororesin.

In the far infrared effect substance-containing layer, the sum of the substance having a far infrared effect, the fluororesin, and the heat-resistant resin preferably represents 90% by mass or more, more preferably 95% by mass or more, and may represent substantially 100% by mass.

The far infrared effect substance-containing layer may contain a substance other than the substance having a far infrared effect, the fluororesin, and the heat-resistant resin, such as a pigment.

The substance other than the substance having a far infrared effect, the fluororesin, and the heat-resistant resin preferably represents less than 10% by mass, more preferably 5% by mass or less, and may represent substantially 0% by mass.

In order to more effectively exhibit the far infrared effect, the far infrared effect substance-containing layer preferably has a thickness of 10 μm or greater, more preferably 15 μm or greater, still more preferably 20 μm or greater. In terms of the physical properties of a film, the thickness is preferably 100 μm or smaller.

In the cooking utensil of the disclosure, a portion of the side inner surface provided with a side laminate film including a far infrared effect substance-containing layer preferably has an area of 50% or larger, more preferably 70% or larger, still more preferably 90% or larger of the area of the inner surface of the side.

The side laminate film may include one far infrared effect substance-containing layer or may include two or more such layers.

The side laminate film may include a layer other than the far infrared effect substance-containing layer, such as a primer layer, a clear layer, or a layer that contains a substance having anticorrosiveness to be described later. The primer layer and the clear layer are described later.

In a preferred embodiment, the side laminate film includes a primer layer and a layer that contains a substance having a far infrared effect, and the substance having a far infrared effect includes at least one selected from ceramic and carbon.

The side laminate film may have a structure of two layers, a structure of three layers, or a structure of four or more layers. Examples of the structure include, from the substrate,
- a two-layer structure of primer layer/far infrared effect substance-containing layer,
- a two-layer structure of first far infrared effect substance-containing layer/second far infrared effect substance-containing layer,
- a three-layer structure of primer layer/first far infrared effect substance-containing layer/second far infrared effect substance-containing layer,
- a three-layer structure of first far infrared effect substance-containing layer/second far infrared effect substance-containing layer/clear layer, and
- a four-layer structure of primer layer/first far infrared effect substance-containing layer/second far infrared effect substance-containing layer/clear layer.

The first far infrared effect substance-containing layer and the second far infrared effect substance-containing layer may be formed from a coating material of the same composition or may be formed from coating materials of different compositions.

The side laminate film may further include an additional layer in addition to the primer layer, the far infrared effect substance-containing layer, and the clear layer.

The side laminate film may have any thickness selected as appropriate in accordance with the use of the cooking utensil, for example. The thickness is preferably 10 to 100 µm.

The bottom laminate film preferably includes a layer that contains a substance having an anticorrosive effect (hereinafter, also referred to as an "anticorrosive effect substance-containing layer"). In common cooking, heating occurs from the bottom of a cooking utensil, so that the bottom preferably has excellent anticorrosiveness. The presence of a layer that contains a substance having an anticorrosive effect on the bottom laminate film can provide a cooking utensil that is less likely to be corroded.

The substance having an anticorrosive effect preferably includes at least one selected from the group consisting of glass, metal, a natural mineral, diamond, fluorinated diamond, and a flaky particulate substance and a metal-oxide-coated product thereof.

That "particles are flaky" herein means that the particles have an aspect ratio (average particle size/average thickness) of 5 or higher. The aspect ratio can be calculated from the average particle size and average thickness measured using a scanning electron microscope (SEM), and the average of the aspect ratios determined for 30 samples is used.

Examples of the flaky particulate substance include silica flake, mica flake, flaky glass, and aluminum flake.

An metal-oxide-coated product of the flaky particulate substance preferably has an aspect ratio of 5 to 750, more preferably 20 to 200. The lower limit thereof is still more preferably 30 and the upper limit thereof is still more preferably 100. The aspect ratio of a metal oxide-coated flaky pigment can be determined by the aforementioned method.

A metal oxide to coat a flaky particulate substance may be any metal oxide, and may include one or two or more selected from titanium oxide ($TiO_2$ (titanium dioxide)), iron oxide ($FeO$, $Fe_2O_3$ (diiron trioxide), $Fe_3O_4$ (triiron tetraoxide)), tin oxide ($SnO_2$ (tin dioxide)), silicon oxide ($SiO_2$ (silicon dioxide)), and the like.

Examples of the natural mineral include mica and talc.

The anticorrosive effect substance-containing layer preferably contains a substance having an anticorrosive effect in an amount of 0.01% by mass or more, more preferably 0.05% by mass or more, still more preferably 0.1% by mass or more, further more preferably 1% by mass or more. The amount of the substance having an anticorrosive effect may be 2% by mass or more or may be 3% by mass or more. The amount thereof is also preferably 40% by mass or less, more preferably 30% by mass or less, still more preferably 20% by mass or less, further more preferably 15% by mass or less, particularly preferably 10% by mass or less.

The anticorrosive effect substance-containing layer preferably further contains a fluororesin. The fluororesin used may be a fluororesin mentioned as an example for the far infrared effect substance-containing layer. The fluororesin preferably includes at least one selected from the group consisting of PTFE, PFA, FEP, PCTFE, ETFE, and PVdF, more preferably at least one selected from the group consisting of PTFE, PFA, and FEP.

The anticorrosive effect substance-containing layer preferably contains a fluororesin in an amount of 60% by mass or more, more preferably 70% by mass or more, preferably 80% by mass or more, more preferably 85% by mass or more, still more preferably 90% by mass or more, while preferably 99.99% by mass or less, preferably 99.95% by mass or less, preferably 99.9% by mass or less, preferably 99% by mass or less, more preferably 98% by mass or less, still more preferably 97% by mass or less.

The anticorrosive effect substance-containing layer also preferably contains a heat-resistant resin. The heat-resistant resin suitably used may be one to be described later for the primer layer.

In this case, the sum of the fluororesin and the fluororesin and the heat-resistant resin preferably represents 60% by mass or more, more preferably 70% by mass or more, still more preferably 80% by mass or more, more preferably 85% by mass or more, still more preferably 90% by mass or more, while preferably 99.99% by mass or less, more preferably 99.95% by mass or less, still more preferably 99.9% by mass or less, particularly preferably 99% by mass or less, more preferably 98% by mass or less, still more preferably 97% by mass or less.

The heat-resistant resin is preferably in an amount of 15 to 50% by mass of the total solid content of the heat-resistant resin and the fluororesin.

In the anticorrosive effect substance-containing layer, the sum of the substance having an anticorrosive effect and the fluororesin preferably represents 90% by mass or more, more preferably 95% by mass or more, and may represent substantially 100% by mass.

The anticorrosive effect substance-containing layer may contain a substance other than the substance having an anticorrosive effect, the fluororesin, and the heat-resistant resin, such as a pigment. The substance other than the substance having a far infrared effect and the fluororesin preferably represents less than 10% by mass, more preferably 5% by mass or less, and may represent substantially 0% by mass.

In the cooking utensil of the disclosure, a portion of the bottom inner surface provided with a bottom laminate film including an anticorrosive effect substance-containing layer preferably has an area of 50% or larger, more preferably 70% or larger, still more preferably 90% or larger of the area of the inner surface of the bottom.

The bottom laminate film may include one anticorrosive effect substance-containing layer or may include two or more such layers.

The bottom laminate film may include a layer other than the anticorrosive effect substance-containing layer, such as a primer layer or a clear layer.

The bottom laminate film may have a structure of two layers, a structure of three layers, or a structure of four or more layers.

Examples of the structure include a two-layer structure of primer layer/anticorrosive effect substance-containing layer, a two-layer structure of first anticorrosive effect substance-containing layer/second anticorrosive effect substance-containing layer, a three-layer structure of primer layer/first anticorrosive effect substance-containing layer/second anticorrosive effect substance-containing layer, a three-layer structure of first anticorrosive effect substance-containing layer/second anticorrosive effect substance-containing layer/clear layer, and a four-layer structure of primer layer/first anticorrosive effect substance-containing layer/second anticorrosive effect substance-containing layer/clear layer.

The first anticorrosive effect substance-containing layer and the second anticorrosive effect substance-containing layer may be formed from a coating material of the same composition or may be formed from coating materials of different compositions.

The bottom laminate film may further include an additional layer in addition to the primer layer, the anticorrosive effect substance-containing layer, and the clear layer.

Preferably, the bottom laminate film includes a primer layer and a layer that contains a substance having an anticorrosive effect, and the substance having an anticorrosive effect includes at least one selected from the group consisting of glass, metal, a natural mineral, diamond, fluorinated diamond, and a flaky particulate substance and a metal-oxide-coated product thereof.

The primer layers of the side laminate film and the bottom laminate film and the clear layers of these films may be the same as or different from each other. They are preferably the same as each other for easy production.

The primer layer preferably contains a heat-resistant resin. The heat-resistant resin is usually a resin recognized as having heat resistance. The "heat resistance" as used herein means an ability to be used continually at a temperature of 150° C. or higher. It should be noted that the heat-resistant resin excludes the aforementioned fluororesins.

The heat-resistant resin preferably includes, but is not limited to, at least one selected from the group consisting of polyamide-imide resin (PAI), polyimide resin (PI), polyethersulfone resin (PES), polyetherimide resin, polyether ether ketone resin, aromatic polyester resin, and polyarylene sulfide resin, more preferably at least one selected from the group consisting of PAI, PI, and PES.

PAI is a resin that contains a polymer containing an amide bond and an imide bond in the molecular structure. PAI may be, but is not limited to, a conventionally known PAI.

PI is a resin that contains a polymer containing an imide bond in the molecular structure. PI may be, but is not limited to, a conventionally known PI.

PES is a resin that contains a polymer containing a sulfonyl group ($-SO_2-$) in the structural molecule. PES may be, but is not limited to, a conventionally known PES.

Preferably, the heat-resistant resin contains polyethersulfone resin and one or both of polyamide-imide resin and polyimide resin, and the polyethersulfone resin represents 65 to 85% by mass of the total amount of the polyethersulfone resin, the polyamide-imide resin, and the polyimide resin.

The primer layer preferably contains a fluororesin. The fluororesin in the primer layer preferably includes at least one selected from the group consisting of PTFE, PFA, FEP, PCTFE, ETFE, and PVdF, more preferably at least one selected from the group consisting of PTFE, PFA, and FEP.

Preferably, the primer layer contains a heat-resistant resin and a fluororesin, and the heat-resistant resin is in an amount of 15 to 50% by mass of the total solid content of the heat-resistant resin and the fluororesin.

Further, in the primer layer, the amount of the heat-resistant resin is preferably 10% by mass or more.

The primer layer may further contain an additive other than the heat-resistant resin and the fluororesin. The additive may be any additive that can be used for a coating to form an inner surface of a cooking utensil.

The primer layer preferably has a thickness of 5 to 40 μm, more preferably 10 to 35 μm. Too thin a primer layer may fail to exert an anchoring effect on the primer surface and may easily generate pinholes, causing poor anticorrosiveness of the laminate. Too thick a primer layer may easily have film defects such as cracking or blistering, causing poor abrasion resistance, poor hardness, and poor anticorrosiveness of the laminate. The upper limit of the thickness of the primer layer is still more preferably 30 μm, particularly preferably 25 μm.

The cooking utensil of the disclosure may include one primer layer or two or more primer layers. In the case where a layer provided directly on the substrate contains a heat-resistant resin, no primer layer may be provided.

The clear layer preferably contains a fluororesin. The fluororesin in the clear layer preferably includes at least one selected from the group consisting of PTFE, PFA, FEP, PCTFE, ETFE, and PVdF, more preferably at least one selected from the group consisting of PTFE, PFA, and FEP.

In the clear layer, the fluororesin is preferably in an amount of 90% by mass or more, more preferably 95% by mass or more. The amount may be substantially 100% by mass.

The clear layer may contain a substance other than the fluororesin, and may contain a heat-resistant resin, for example. The substance other than the fluororesin preferably represents 10% by mass or less, more preferably 5% by mass or less, and may represent substantially 0% by mass.

Next, more specific embodiments of the cooking utensil of the disclosure are described below.

Figure 2:
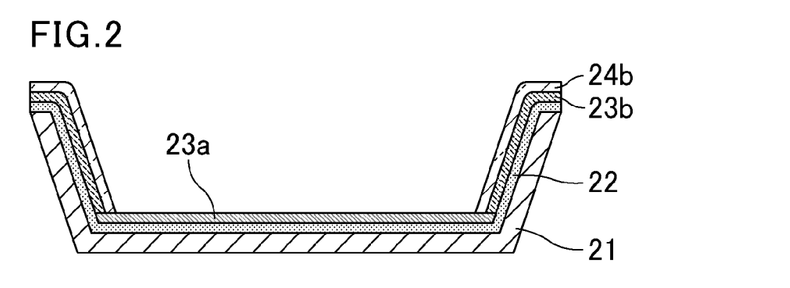
FIG. 2 is a schematic cross-sectional view of an example of the cooking utensil of the disclosure (bottom: two layers, side: three layers).
Figure 3:
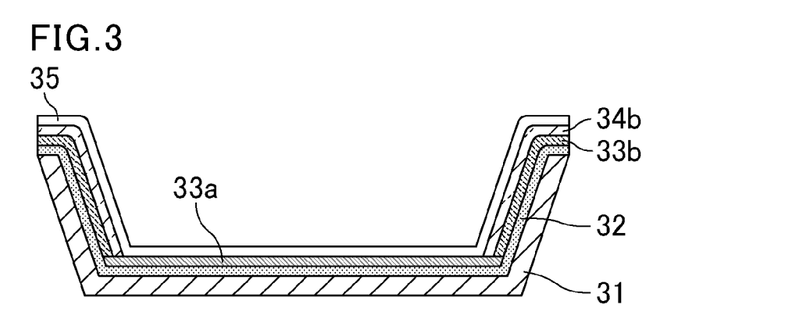
FIG. 3 is a schematic cross-sectional view of an example of the cooking utensil of the disclosure (bottom: three layers, side: four layers).

Examples thereof include:

an embodiment as illustrated in FIG. 1 in which the bottom laminate film has a two-layer structure of primer layer 12/anticorrosive effect substance-containing layer 13a and the side laminate film has a two-layer structure of primer layer 12/far infrared effect substance-containing layer 13b;

an embodiment as illustrated in FIG. 2 in which the bottom laminate film has a two-layer structure of primer layer 22/anticorrosive effect substance-containing layer 23a and the side laminate film has a three-layer structure of primer layer 22/first far infrared effect substance-containing layer 23b/second far infrared effect substance-containing layer 24b; and an embodiment as illustrated in FIG. 3 in which the bottom laminate film has a three-layer structure of primer layer 32/anticorrosive effect substance-containing layer 33a/clear layer 35 and the side laminate film has a four-layer structure of primer layer 32/first far infrared effect substance-containing layer 33b/second far infrared effect substance-containing layer 34b/clear layer 35.

Figure 4:
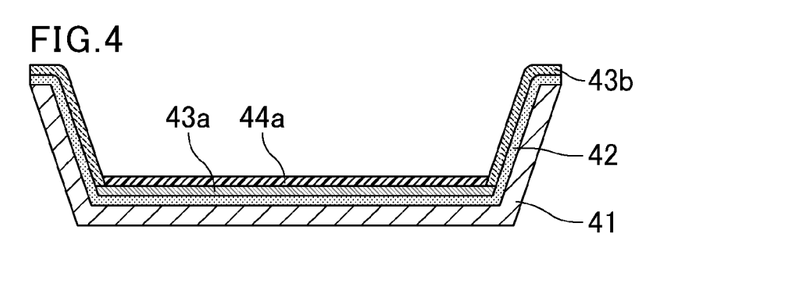
FIG. 4 is a schematic cross-sectional view of an example of the cooking utensil of the disclosure (bottom: three layers, side: two layers).
Figure 5:
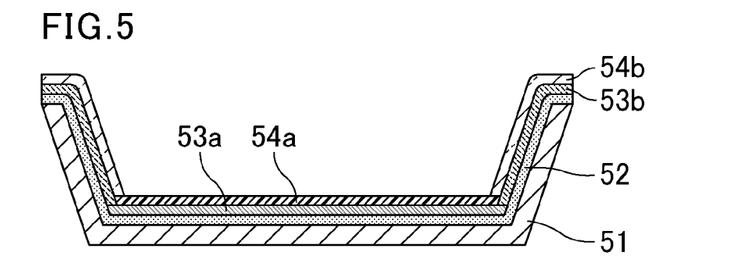
FIG. 5 is a schematic cross-sectional view of an example of the cooking utensil of the disclosure (bottom: three layers, side: three layers).
Figure 6:
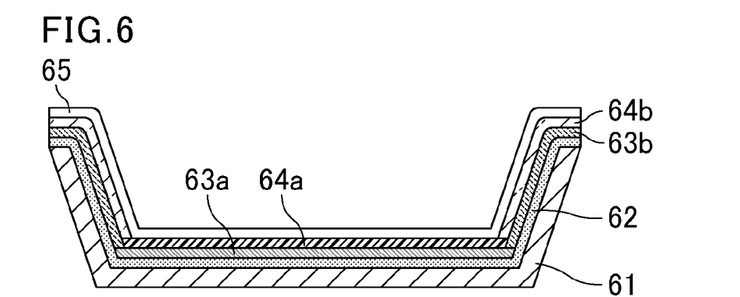
FIG. 6 is a schematic cross-sectional view of an example of the cooking utensil of the disclosure (bottom: four layers, side: four layers).

Examples also include an embodiment as illustrated in FIG. 4 in which the bottom laminate film has a three-layer structure of primer layer 42/first anticorrosive effect substance-containing layer 43a/second anticorrosive effect substance-containing layer 44a and the side laminate film has a two-layer structure of primer layer 42/far infrared effect substance-containing layer 43b;

an embodiment as illustrated in FIG. 5 in which the bottom laminate film has a three-layer structure of primer layer 52/first anticorrosive effect substance-containing layer 53a/second anticorrosive effect substance-containing layer 54a and the side laminate film has a three-layer structure of primer layer 52/first far infrared effect substance-containing layer 53b/second far infrared effect substance-containing layer 54b; and an embodiment as illustrated in FIG. 6 in which the bottom laminate film has a four-layer structure of primer layer 62/first anticorrosive effect substance-containing layer 63a/second anticorrosive effect substance-containing layer 64a/clear layer 65 and the side laminate film has a four-layer structure of primer layer 62/first far infrared effect substance-containing layer 63b/second far infrared effect substance-containing layer 64b/clear layer 65.

Figure 7:
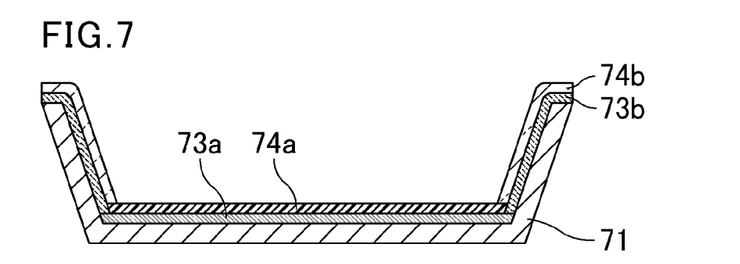
FIG. 7 is a schematic cross-sectional view of an example of the cooking utensil of the disclosure (bottom: two layers, side: two layers).

Examples further include an embodiment as illustrated in FIG. 7 in which the bottom laminate film has a two-layer structure of first anticorrosive effect substance-containing layer 73a/second anticorrosive effect substance-containing layer 74a and the side laminate film has a two-layer structure of first far infrared effect substance-containing layer 73b/second far infrared effect substance-containing layer 74b. In this case, the first anticorrosive effect substance-containing layer and the first far infrared effect substance-containing layer serve as primer layers.

The bottom laminate film may include no far infrared effect substance-containing layer and the side laminate film may include no anticorrosive effect substance-containing layer.

The cooking utensil of the disclosure may be produced by a method including (1) optionally applying a composition for a primer and forming a primer film on a substrate, (2) applying a composition that contains a substance having an anticorrosive effect to the substrate on the bottom or to the primer film on the bottom and forming an anticorrosive effect substance-containing layer film, and (3) applying a composition that contains a substance having a far infrared effect to the substrate on the side or to the primer film on the side and forming a far infrared effect substance-containing layer film. If necessary, to the anticorrosive effect substance-containing layer film on the bottom, a composition that contains a substance having an anticorrosive effect may be applied to form a second anticorrosive effect substance-containing layer film or a composition for a clear layer may be applied to form a clear layer film. Also, to the far infrared effect substance-containing layer film on the side, a composition that contains a substance having a far infrared effect may be applied to form a second far infrared effect substance-containing layer film or a composition for a clear layer may be applied to form a clear layer film.

The composition for a primer, the composition that contains a substance having an anticorrosive effect, and the composition that contains a substance having a far infrared effect each may be prepared as appropriate by a known method in accordance with the structure of the film to be formed.

Each composition may be applied by any method. In the case where the composition is in the form of liquid, examples of the method include spray coating, roll coating, doctor blade coating, dip (immersion) coating, impregnation coating, spin flow coating, and curtain flow coating. Preferred is spray coating.

Coating of the bottom and of the side in a separate manner may be performed by any method. An example is a method in which a mask with an opening corresponding to the bottom or the side is placed in the form of a primer film and a composition for forming a middle coat layer, top coat layer, or the like is applied thereto with the mask in between.

Drying may or may not be performed after the step (1) and before the step (2) and the step (3). Further, sintering may or may not be performed.

The drying in the step (1) is preferably performed at 100° C. to 150° C. for 5 to 60 minutes. The sintering, when performed, is preferably performed at 300° C. to 400° C. for 10 to 30 minutes.

The primer film may be formed by applying the composition for a primer to the substrate and optionally drying or sintering the composition. The primer film serves as a primer layer in the resulting cooking utensil.

In the case of forming two or more primer layers, the step (1) is performed with the formulation of the composition for a primer being optionally changed.

The step (2) includes applying a composition that contains a substance having an anticorrosive effect to the substrate on the bottom or to the primer film on the bottom and forming a middle coat film on the bottom.

Applying a composition that contains a substance having an anticorrosive effect to the substrate or to the primer film may be performed by any method, such as the same method as for applying the composition for a primer.

Drying or sintering may be performed in the step (2) after the composition that contains a substance having an anticorrosive effect is applied to the substrate or to the primer film. The drying or sintering in the step (2) is preferably performed under the same conditions as for the drying or sintering in the step (1).

The step (3) includes applying a composition that contains a substance having a far infrared effect to the substrate on the side or to the primer film on the side and forming a middle coat film on the side.

Applying the composition that contains a substance having a far infrared effect to the substrate or to the primer film may be performed by any method, such as the same method as for applying the composition for a primer.

Drying or sintering may be performed in the step (3) after the composition that contains a substance having a far infrared effect is applied to the substrate or to the primer film. The drying or sintering in the step (3) is preferably performed under the same conditions as for the drying or sintering in the step (1).

In the production method, the step (1) may be followed by the step (2) and then the step (3), or the step (1) may be followed by the step (3) and then the step (2). The step (2) and the step (3) may be performed in any order.

In the case of forming two or more layers that contain a substance having an anticorrosive effect and two or more layers that contain a substance having a far infrared effect, the step (2) or the step (3) is repeated with the formulation of the composition being optionally changed.

In common cases, the optional step (1), the step (2), the step (3), and optional formation of other films are performed and then all films are sintered simultaneously, whereby laminate films on the bottom and the side are obtained.

The production method may include printing letters or drawings, for example, after the step (1), the step (2), or the step (3).

An example of the printing may be, but is not limited to, pad transfer printing. An example of printing ink used for the printing may be, but is not limited to, a composition containing PES, a TFE homopolymer, and titanium oxide.

Examples of the cooking utensil include a baking tray, an oven plate, a grille tray, an iron plate for yakiniku, an inner pot for a rice cooker, an inner pot of an electric kettle, a plate for an electric griddle, a frying pan, Japanese rolled omelet, a microwave tray, a pot, an electric skillet, and a tray for a toaster oven. The cooking utensil of the disclosure is preferably a frying pan, a pot, or an electric skillet, more preferably a frying pan.

In the case where the cooking utensil is a frying pan, the cooking utensil commonly includes a rod handle fixed on the outer surface of the bottom.

Examples of a device provided with the cooking utensil include a gas stove, an electric stove, a gas microwave oven, an electric microwave oven, a microwave, a rice cooker, a BBQ stove, a pressure cooker, a griller, a toaster oven, an electric kettle, and an automatic tea server.

EXAMPLES

The cooking utensil of the disclosure is described hereinbelow with reference to examples, but the cooking utensil of the disclosure is not intended to be limited by these examples.

The parameters in the examples were measured by the following methods.

Evaluation of Side Far Infrared Effect (Far Infrared Emissivity Measurement Test)

The far infrared emissivity (integral emissivity) at 200° C. was measured using a far infrared emissivity meter (JIR5500 available from JEOL Ltd., equipped with an infrared radiation unit IR-IRR200).

Evaluation of Bottom Anticorrosiveness (Oden No Moto) (Evaluation Method)

Two cuts were formed on the coating surface using a utility knife such that they each had a length of 50 mm, reached the substrate, and crossed each other (in a crosscut pattern). This coated plate for testing was immersed in a solution of 20 g Oden No Moto (available from S&B Foods Inc.) in 1 L water and the temperature was maintained at 70° C. for 500 hours. Then, the presence or absence of any defects such as occurrence of blistering (scabs in the film) was observed.

Good: No blistering occurred.

Fair: Blistering of smaller than 3 mm occurred at crosscut portions (no defect was observed at portions other than the crosscut portions).

Poor: Blistering occurred on the entire surface.

(Color Difference)

The color tones of the film surfaces were measured using color meter ZE6000 available from Nippon Denshoku Industries Co., Ltd.

(Evaluation Method)

A color difference of $\Delta E^*ab > 2.3$ corresponds to the just noticeable difference.

Good: $\Delta E^*ab > 2.3$

Poor: $\Delta E^*ab < 2.3$

Examples 1 to 21 and Comparative Examples 1 and 2

<Substrate>

A substrate used was prepared by degreasing the surface of an aluminum plate with acetone.

<Clear Base Coating Material Composition>

A clear base coating material composition (hereinafter, also referred to as a clear base) used was a fluororesin-containing clear coating material (fluororesin: PTFE) available from Daikin Industries, Ltd.

<Primer Coating Material Composition>

A primer coating material composition (hereinafter, also referred to as a primer) used was a fluororesin-containing primer coating material (fluororesin: PTFE, heat-resistant resin: PAI) available from Daikin Industries, Ltd.

<Method for Preparing Anticorrosive Fluororesin Coating Material Composition for Middle Coat and Top Coat>

A substance having an anticorrosive effect (e.g., titanium dioxide-coated silica flake) was weighed, and added to and mixed with water into a uniform state. The mixture was added to the clear base coating material composition and stir-mixed using a 3-1 motor at 300 rpm for 20 minutes. Thereby, an anticorrosive fluororesin coating material composition was obtained.

<Method for Preparing Far-Infrared Fluororesin Coating Material Composition for Middle Coat and Top Coat>

A substance having a far infrared effect (e.g., silicon carbide) was weighed and added to and mixed with water into a uniform state. The mixture was added to the clear base coating material composition and stir-mixed using a 3-1 motor at 300 rpm for 20 minutes. Thereby, an anticorrosive fluororesin coating material composition was obtained.

<Formation of Primer Film>

The primer coating material was applied by air spraying using a small spray gun to a surface to be coated of the substrate such that a dried film was to be 10 to 15 μm.

<Formation of Middle Coat Film>

The anticorrosive or far-infrared fluororesin coating material composition for a middle coat was applied by air spraying using a small spray gun to the primer film such that a film after sintering was to be 5 to 30 μm. The coated workpiece was dried using a hot air circulating dryer or an infrared dryer at 100° C. for 15 minutes, whereby a dried film was obtained.

<Formation of Top Coat Film>

The anticorrosive fluororesin coating material composition for a top coat was applied by air spraying using a small spray gun to the middle coat film such that a film after sintering was to be 5 to 30 μm. The coated workpiece was dried using a hot air circulating dryer or an infrared dryer at 100° C. for 15 minutes, whereby a dried film was obtained.

<Preparation of Clear Coating Material Composition>

The clear coating material composition in the examples is a coating material composition to provide a transparent film containing neither an anticorrosive material nor a pigment.

<Formation of Clear Film>

A clear film was formed by applying and drying the clear coating material composition to the middle coat film or the top coat film in the same manner as in the formation of the middle coat film or the top coat film.

<Production of Laminate for Evaluation>

A laminate of the dried films obtained as described above was sintered in a furnace at 380° C. for 20 minutes, whereby a laminate for evaluation was produced.

Laminates for evaluation having the respective layer structures as listed in Table 1 were produced by the aforementioned method and were used for the side or the bottom. The amounts of the fluororesins and the pigments in the coating material compositions used in the examples and the comparative examples were as follows. The amount of each component is expressed in parts by weight of solid content relative to 100 parts by weight of the solid content of the coating material composition (the residue of the film layer after the coating material composition applied was sintered at 380° C.)

(Far-Infrared Fluororesin Coating Material Composition A)
 fluororesin in clear base 52.0% by mass
 silicon carbide 48.0% by mass (Anticorrosive Fluororesin Coating Material Composition I)
 fluororesin in clear base 93.0% by mass
 titanium oxide-coated mica flake 7.0% by mass (Anticorrosive Fluororesin Coating Material Composition J)
 fluororesin in clear base 93.0% by mass
 titanium oxide-coated flaky glass 7.0% by mass (Far-Infrared Fluororesin Coating Material Composition K)
 fluororesin in clear base 50.0% by mass
 heat-resistant resin 10.0% by mass
 silicon carbide 40.0% by mass (Anticorrosive Fluororesin Coating Material Composition L)
 fluororesin in clear base 78.0% by mass
 heat-resistant resin 15.0% by mass
 titanium oxide-coated silica flake 7.0% by mass

TABLE 1

|  |  | Number of layers | Primer layer | Side Middle coat layer | Bottom middle coat layer | Side top coat layer | Bottom top coat layer | Clear layer | Color difference ΔE*ab > 2.3 | Bottom anti-corrosiveness Oden No Moto | Side far infrared effect Far infrared emissivity | Side far infrared emissivity/ bottom far infrared emissivity |
|---|---|---|---|---|---|---|---|---|---|---|---|---|
| Examples | 1 | 3 layers | Present | A | G | A | G | Absent | 18.6 | Good | 0.94 | 1.30 |
|  | 2 | 3 layers | Present | A | G | — | — | Present | 18.6 | Good | 0.90 | 1.20 |
|  | 3 | 2 layers | Present | A | G | — | — | Absent | 18.6 | Good | 0.91 | 1.21 |
|  | 4 | 3 layers | Present | A | H | A | H | Absent | 51.4 | Good | 0.94 | 1.28 |
|  | 5 | 3 layers | Present | A | I | A | I | Absent | 13.6 | Good | 0.94 | 1.29 |
|  | 6 | 3 layers | Present | A | J | A | J | Absent | 16.0 | Good | 0.94 | 1.29 |
|  | 7 | 3 layers | Present | B | G | B | G | Absent | 20.9 | Good | 0.93 | 1.29 |
|  | 8 | 3 layers | Present | B | G | — | — | Present | 20.9 | Good | 0.90 | 1.20 |
|  | 9 | 3 layers | Present | B | H | B | H | Absent | 50.8 | Good | 0.93 | 1.27 |
|  | 10 | 2 layers | Present | B | H | — | — | Absent | 50.8 | Good | 0.90 | 1.20 |
|  | 11 | 3 layers | Present | B | I | B | I | Absent | 14.9 | Good | 0.93 | 1.27 |
|  | 12 | 3 layers | Present | B | J | B | J | Absent | 14.0 | Good | 0.93 | 1.29 |
|  | 13 | 3 layers | Present | C | I | C | I | Absent | 15.9 | Good | 0.92 | 1.26 |
|  | 14 | 3 layers | Present | D | I | D | I | Absent | 17.4 | Good | 0.91 | 1.25 |
|  | 15 | 3 layers | Present | E | I | E | I | Absent | 17.6 | Good | 0.90 | 1.23 |
|  | 16 | 3 layers | Present | F | I | F | I | Absent | 22.9 | Good | 0.91 | 1.25 |
|  | 17 | 2 layers | Present | G | A | — | — | Absent | 18.6 | Poor | 0.75 | 0.82 |
|  | 18 | 2 layers | Present | I | B | — | — | Absent | 14.9 | Poor | 0.78 | 0.87 |
|  | 19 | 3 layers | Present | G | A | G | A | Absent | 18.6 | Fair | 0.72 | 0.77 |
|  | 20 | 3 layers | Present | I | B | I | B | Absent | 14.9 | Fair | 0.73 | 0.78 |
|  | 21 | 2 layers | Absent | K | L | K | L | Absent | 18.6 | Good | 0.91 | 1.28 |
| Comparative Examples | 1 | 3 layers | Present | G | G | G | G | Absent | 0 | Good | 0.72 | 1.00 |
|  | 2 | 3 layers | Present | A | A | A | A | Absent | 0 | Poor | 0.94 | 1.00 |

(Far-Infrared Fluororesin Coating Material Composition B)
 fluororesin in clear base 55.0% by mass
 alumina 45.0% by mass (Far-Infrared Fluororesin Coating Material Composition C)
 fluororesin in clear base 60.0% by mass
 boron carbide 40.0% by mass (Far-Infrared Fluororesin Coating Material Composition D)
 fluororesin in clear base 70.0% by mass
 silicon nitride 30.0% by mass (Far-Infrared Fluororesin Coating Material Composition E)
 fluororesin in clear base 60.0% by mass
 zirconium oxide 40.0% by mass (Far-Infrared Fluororesin Coating Material Composition F)
 fluororesin in clear base 70.0% by mass
 boron nitride 30.0% by mass (Anticorrosive Fluororesin Coating Material Composition G)
 fluororesin in clear base 93.0% by mass
 titanium oxide-coated silica flake 7.0% by mass (Anticorrosive Fluororesin Coating Material Composition H)
 fluororesin in clear base 93.0% by mass
 iron oxide-coated silica flake 7.0% by mass

REFERENCE SIGNS LIST 11, 21, 31, 41, 51, 61: substrate
11a: bottom of substrate
11b: side of substrate
12, 22, 32, 42, 52, 62: primer layer
13a, 23a, 33a, 43a, 53a, 63a, 73a: (first) anticorrosive effect substance-containing layer
13b, 23b, 33b, 43b, 53b, 63b, 73b: (first) far infrared effect substance-containing layer
44a, 54a, 64a, 74a: second anticorrosive effect substance-containing layer
24b, 34b, 54b, 64b, 74b: second far infrared effect substance-containing layer
35, 65: clear layer

The invention claimed is:
1. A cooking utensil comprising
 a bottom and a side extending substantially upward from a perimeter of the bottom,
 the bottom comprising a bottom laminate film on an inner surface thereof,
 the side comprising a side laminate film that is different from the bottom laminate film on an inner surface thereof, the bottom laminate film and the side laminate film having different color tones, wherein the side laminate film comprises a layer that contains a substance having a far infrared effect, the substance having a far infrared effect comprises at least one selected from ceramic and carbon, the ceramic comprises at least one selected from the group consisting of aluminum oxide, beryllium oxide, cerium oxide, chromium oxide, cobalt oxide, nickel oxide, silicon oxide, tantalum oxide, thallium oxide, vanadium oxide, yttrium oxide, zirconium oxide, magnesium oxide, and complex oxides of any of these, aluminum boride, barium boride, calcium boride, cerium boride, hafnium boride, lanthanum boride, strontium boride, yttrium boride, aluminum nitride, silicon nitride, titanium nitride, boron carbide, chromium carbide, hafnium carbide, molybdenum carbide, silicon carbide, tantalum carbide, thallium carbide, tungsten carbide, yttrium carbide and zirconium carbide, and the bottom laminate film includes no far infrared effect substance-containing layer.

2. The cooking utensil according to claim 1, wherein the bottom laminate film and the side laminate film have different far infrared effects.

3. The cooking utensil according to claim 1, wherein the bottom laminate film and the side laminate film have different anticorrosive effects.

4. The cooking utensil according to claim 1, wherein the bottom laminate film and the side laminate film comprise a primer layer.

5. The cooking utensil according to claim 1, wherein the layer that contains a substance having a far infrared effect further contains a fluororesin.

6. The cooking utensil according to claim 5, wherein the fluororesin comprises at least one selected from the group consisting of polytetrafluoroethylene, a tetrafluoroethylene-perfluoroalkyl vinyl ether copolymer, a tetrafluoroethylene-hexafluoropropylene copolymer, polychlorotrifluoroethylene, a tetrafluoroethylene-ethylene copolymer, and polyvinylidene fluoride.

7. The cooking utensil according to claim 1, wherein the bottom laminate film comprises a primer layer and a layer that contains a substance having an anticorrosive effect, and the substance having an anticorrosive effect comprises at least one selected from the group consisting of glass, metal, a natural mineral, diamond, fluorinated diamond, and a flaky particulate substance and a metal-oxide-coated product thereof.

8. The cooking utensil according to claim 7, wherein the layer that contains a substance having an anticorrosive effect further contains a fluororesin.

9. The cooking utensil according to claim 8, wherein the fluororesin comprises at least one selected from the group consisting of polytetrafluoroethylene, a tetrafluoroethylene-perfluoroalkyl vinyl ether copolymer, a tetrafluoroethylene-hexafluoropropylene copolymer, polychlorotrifluoroethylene, a tetrafluoroethylene-ethylene copolymer, and polyvinylidene fluoride.

10. The cooking utensil according to claim 4, wherein the primer layer comprises a heat-resistant resin, and the heat-resistant resin comprises at least one selected from the group consisting of polyamide-imide resin, polyimide resin, polyethersulfone resin, polyetherimide resin, polyether ether ketone resin, aromatic polyester resin, and polyarylene sulfide resin.

11. The cooking utensil according to claim 10, wherein the heat-resistant resin comprises polyethersulfone resin and one or both of polyamide-imide resin and polyimide resin, and the polyethersulfone resin represents 65 to 85% by mass of a total amount of the polyethersulfone resin, the polyamide-imide resin, and the polyimide resin.

12. The cooking utensil according to claim 4, wherein the primer layer comprises a heat-resistant resin and a fluororesin, and the heat-resistant resin is in an amount of 15 to 50% by mass of a total solid content of the heat-resistant resin and the fluororesin.

13. The cooking utensil according to claim 12, wherein the fluororesin in the primer layer comprises at least one selected from the group consisting of polytetrafluoroethylene, a tetrafluoroethylene-perfluoroalkyl vinyl ether copolymer, a tetrafluoroethylene-hexafluoropropylene copolymer, polychlorotrifluoroethylene, a tetrafluoroethylene-ethylene copolymer, and polyvinylidene fluoride.

14. The cooking utensil according to claim 1, wherein the bottom laminate film and the side laminate film further comprise a clear layer.

15. The cooking utensil according to claim 1, wherein the cooking utensil is a frying pan.

* * * * *